Jan. 23, 1951　　　　　　　G. OYER　　　　　　2,539,319
MECHANICAL PRESS FOR PRESSURE MOLDING
Filed May 5, 1947　　　　　　　　　　　　2 Sheets-Sheet 1
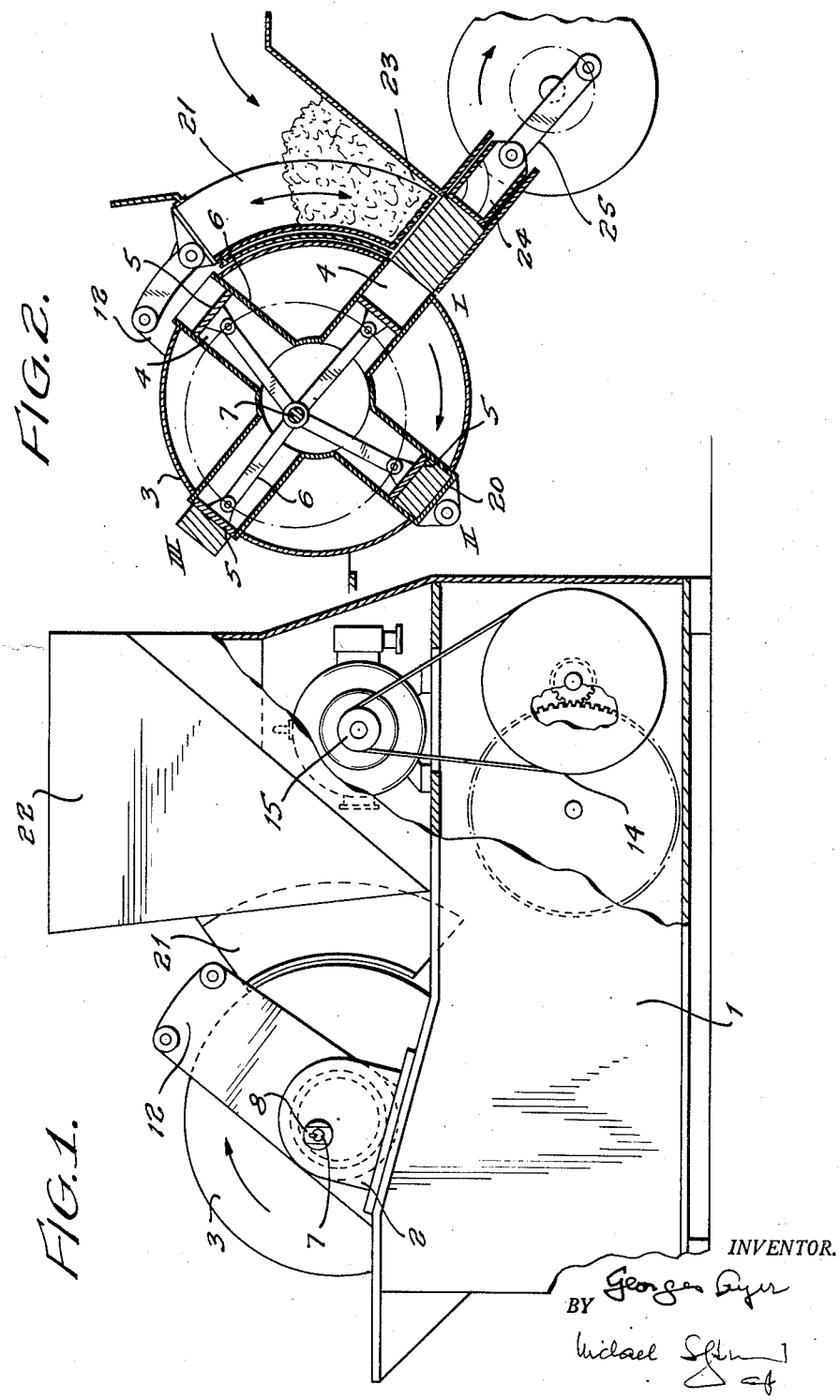
INVENTOR.
BY Georges Oyer Jan. 23, 1951 G. OYER 2,539,319
MECHANICAL PRESS FOR PRESSURE MOLDING
Filed May 5, 1947 2 Sheets-Sheet 2

INVENTOR.
BY George Oyer

Patented Jan. 23, 1951

2,539,319

UNITED STATES PATENT OFFICE 2,539,319

MECHANICAL PRESS FOR PRESSURE MOLDING

Georges Oyer, Paris, France

Application May 5, 1947, Serial No. 746,006
In France May 21, 1946

3 Claims. (Cl. 25—80.)

The invention relates to improvements in machines used to press or form blocks of clay, concrete or other material for building purposes, wherein the four operations of packing the clay, filling the mold, pressing the clay therein, and discharging the pressed block from the mold are done in the time required otherwise to perform but one of said functions, by means of a mold member having molds disposed around the periphery of said mold member; a mechanism for rotating such mold member; means for exerting a pressure upon the material in the molds from the inner side of the mold member as said mold member rotates; means for automatically opening and closing respectively said molds as required when said mold member rotates, and automatic means for emptying the pressed block from said molds.

The object of this invention is to improve machines of the character described, particularly to improve the mechanism controlling the movement of the various parts of the machine, and various improvements in detail hereinafter pointed out.

In the attached drawings, a press for moulding bricks is shown more or less schematically, which is made in accordance with the invention:

Fig. 1 is a general view of the press;

Fig. 2 is a diagrammatic cross section of the moulding cylinder and the feed-hopper;

Figures 4, 5:
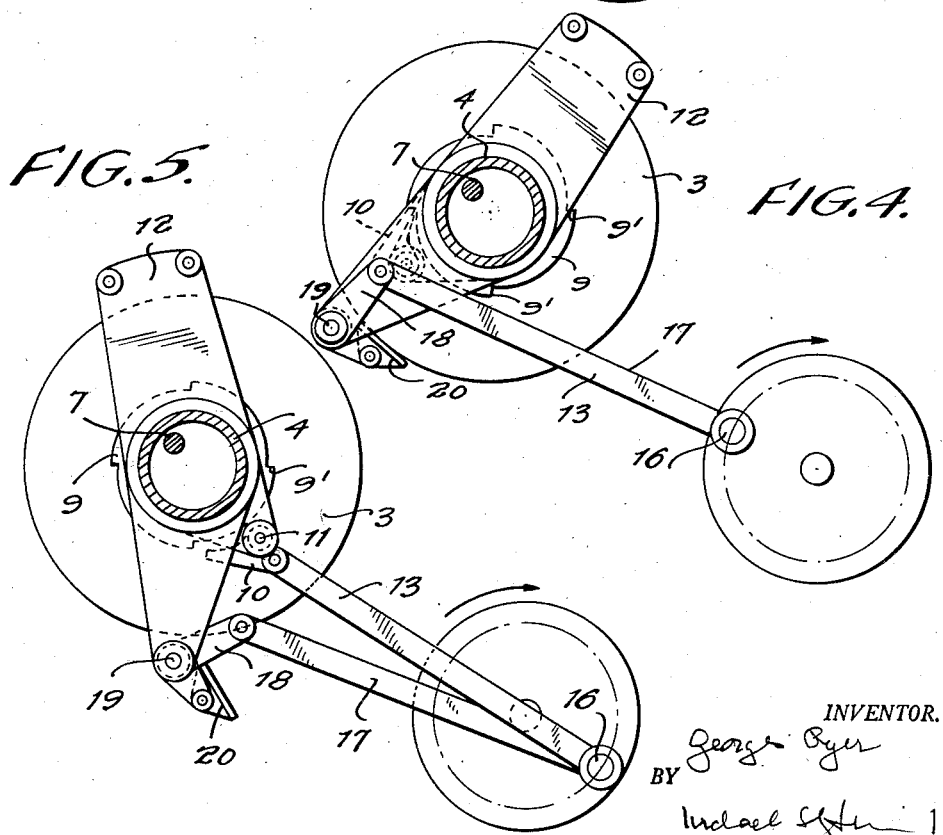
Fig. 4 is a diagrammatical view with partial section of the cylinder as a whole seen in Fig. 2 and of the operating mechanism.
Fig. 5 is a view similar to Fig. 4 showing the working parts in the position of Fig. 3.

On a frame 1, of any convenient shape, is rotatably mounted a cylinder 3, bearings 2, the cylinder being provided with hollow trunnions journals 4 (Figs. 4 and 5). In the cylinder 3, moulds 4' are arranged, in any desired number (the given example indicates four) set at equal intervals around the axis of the cylinder, while in each mould is housed a sliding piston 5 in suitably airtight manner.

The various pistons 5 are fitted with connecting-rods or stems 6 (Figs. 2 and 3) hinged to a common stud 7 which is eccentric with respect to the journal 4. On stud 7 is arranged a device for adjustment of this stud, consisting, for example, of a slide 8 provided with attachment or setting means, not shown.

On one or on both the side surfaces of the cylinder is a ratchet 9, on which is a number of one-way teeth 9' equal to the number of moulds 4'. A hinged catch or pawl 10, fixed on a pivot 11 of an arm 12 is engageable with ratchet teeth 9' and rotates on the trunnion or journal 4. Catch or pawl 10 is pivotally connected to a connecting-rod 13, and by the latter to a reducer transmission 14, of any suitable type, through gears or other means. The connecting-rod 13 is pivotally connected at 16 to the gearing mentioned and actuated by a motor 15, suitably fixed on the frame 1, such motor being electric or of any other desired type.

To the pivot 16 controlling operation of the connecting-rod 13 is connected a second connecting-rod 17 (Fig. 5) which by means of a bell crank lever 18 pivoted at 19 on the arm 12, acts on a movable plate 20 which is connected to lever 18 and intended to be disposed at the bottom of each mould while the material is being compressed.

Figure 3:
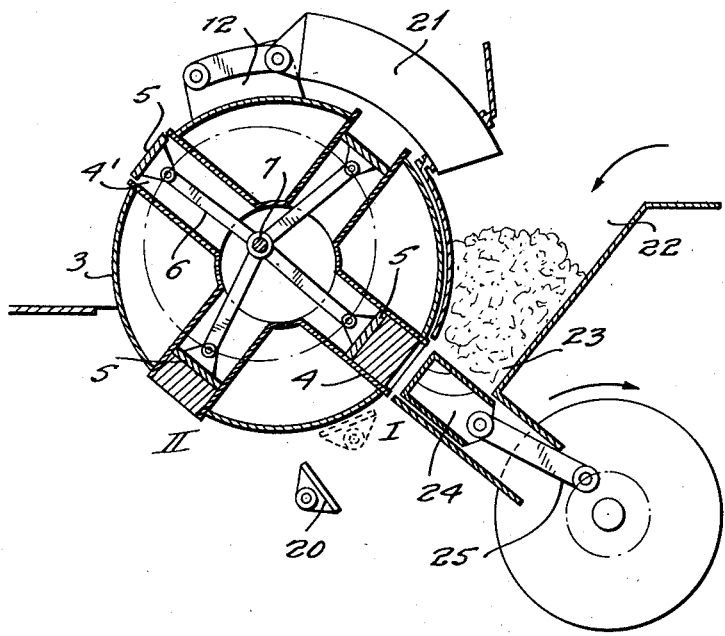
Fig. 3 is a view similar to that of Fig. 2 but showing the working parts in another position.

Each of the arms 12 is extended as shown in Fig. 1, with these arms pivotally connected to and actuating a plunger 21, entering the hopper 22 to take up the material, such as clay or whatever is used, with which the bricks are intended to be made. The loading nozzle 23 terminates close to the point at which the moulds are filled, as best seen in Figs. 2 and 3. At that point, the nozzle which may be of cylindrical shape for example, is open on one side so as to receive the material, contains a ramming-piston 24, provided with an actuating connecting-rod 25 deriving its operation from transmission 14.

Operation is as follows:

The hopper 22 is appropriately kept full of material, such as clay or any other material, the working parts assuming the position, for example shown in Figs. 3 and 5, with the pivot 16 at its low dead-center. When the pivot is rotated in the direction shown by the arrow, it causes, through the connecting-rod 13 and the pawl 10, rotation of the cylinder 3 which moves a quarter of a turn while the arms 12 execute the same change in position. The plunger or ram 21 assumes the position of Fig. 2, cramming the clay from the hopper into position in front of the cylinder occupying position I. At that moment the pivot 16 has taken up the symmetrical position with that shown in Fig. 5; the pawl 10 then leaves the ratchet 9 whereas the cylinder 3 then remains stationary while the pivot 16 returns to the position of Fig. 5. During this time, the piston 24, driven by its connecting-rod 25, crams the clay, previously packed by the ram 21, into the mould occupying position I.

The pivot 16, by starting a fresh cycle, acts through the connecting-rod 17 on the plate 20 which assumes the position indicated adjacent to I in Fig. 3, so as to form the bottom of the groove shaped by the mold that has just been filled with packed clay. The cylinder is now operated at the same time by the connecting-rod 13, moving round one quarter of a turn. At the beginning of such rotation, the base formed by the plate 20, applied against the rims of the mould 4, holds the clay in position while the corresponding piston 5 following the eccentric track indicated by dots and dashes in Figs. 2 and 3 exerts on the clay a degree of compression suitably adjusted in advance, and controlled by the position of the device 8 for regulating eccentricity of stud 7 (Fig. 1). This compression takes place while the mould passes from position I to position II. Once the latter position has been attained, the required compression having been produced the plate 20 is returned by the connecting-rod 17 to the position of Fig. 5. In this manner the mould is uncovered in which the compressed and gripped clay remains fixed.

During the mentioned operation, the ram has brought up a fresh quantity of clay opposite the empty mould that has become located in position I, while piston 24 has filled the mould, appropriately packing the clay.

A fresh movement on the part of the connecting-rods 13 and 17 brings the finished brick into the position III of Fig. 2, turning the brick out of the mould, whereupon it is picked up either by hand or mechanically, for conveyance to the place where it is to dry and thereafter burned.

The same cycle is repeated indefinitely while the hopper is kept loaded in any desired manner either by hand or mechanically with material such as either clay or any other suitable material or mixture of materials, previously brought to the required condition by crushing, for example or by any other appropriate method of treatment.

The cylinder 3 can be constructed with any desired dimensions and can be arranged to contain any fixed number of moulds set in proper manner at intervals on its circumference, while several filling points for those moulds can also be arranged, as required, on the mentioned circumference, each point being fed either by a separate hopper or by a common hopper.

The connecting-rods can be flexible with the plate 20 connected by a suitably controlled articulation to the bellcrank lever 18, pivoting of this lever on the arm 7 being limited to allow the arm to be operated equally in the direction shown by the arrow in Fig. 1 as in the opposite direction. The same description applies to the mounting of the catch or pawl 19 on its articulation. The machine can be completed by suitable devices for cleaning or scouring, with particular reference to the pistons 5, piston 24 and the retaining plate 20.

The pistons 5 could be actuated by cam or the like, which may be adjustable, if desired. The packing of the clay or other material into the lower part or nozzzle 23 for loading of the hopper could be carried out by means of an eccentric device or a cam which is given a continuous rotation timed with the movement of the cylinder 3.

Due to the advantageous arrangement described, the press or machine is capable of producing a considerable output that can be increased still further by provision of additional points or stations for filling the moulds, the finished bricks then being taken up mechanically which is also true of the conveyance of the completed bricks to the stacking point.

The invention concerns the mechanical making of bricks or similar objects of any kind whatever, for various purposes, whether or not the objects are to be given a subsequent treatment such as burning or the like.

While I have described my invention in detail in its present preferred embodiment, it will be obvious to those skilled in the art, after due consideration thereof, that various changes and modifications may be made therein without departing from the spirit or scope of my invention, and in the appended claims I intend to cover all such modifications and changes.

Having now fully described my invention, I claim:

1. In a machine of the character described, comprising a rotatably mounted mold member having a plurality of molds thereon with a piston reciprocable in each mold, and operating means for rotating the mold member, the combination, with an eccentric mounted coaxially with said mold member and operated by the operating means, and a connecting rod for each piston operated by said eccentric, of automatic feeding means and means for automatically opening and closing the molds as the mold member rotates, including a form for premolding spaced a predetermined distance from the molds upon said mold member; a further piston in the form; a hopper disposed in effective position to feed material into said form; a plunger in the hopper adapted to pack said material in said form from said hopper independently of the further piston; means for actuating said further piston; an arm mounted for rotation about the axis of rotation of said mold member, one portion of said arm being connected to and actuating the plunger in said hopper upon movement of said arm; and means operated by said operating means for imparting through another portion of said arm a reciprocating semi-rotary motion to said arm about said axis of rotation.

2. In a machine of the character described, comprising a rotatably mounted mold member having a plurality of molds thereon with a piston reciprocable in each mold, and operating means for rotating the mold member, the combination, with an eccentric mounted coaxially with said mold member and operated by the operating means, and a connecting rod for each piston operated by said eccentric, of automatic feeding means and means for automatically opening and closing the molds as the mold member rotates, including a form for premolding spaced a predetermined distance from the molds upon said mold member; a further piston in the form; a hopper disposed in effective position to feed material into said form; an arcuate plunger mounted for reciprocating movement inwardly into and outwardly from the hopper for packing said material in said form; said arcuate plunger being guided in its reciprocating movement to follow an arcuate path about the axis of rotation of said mold member by a portion upon said hopper; means for actuating said further piston; an arm mounted for rotation about said axis of rotation of said mold member, one end of said arm being connected to said arcuate plunger for actuating the latter upon movement of said arm; and means operated by said operating means for imparting through the other end of said arm a reciprocating semi-rotary movement to said arm.

3. In a machine of the character described, comprising a rotatable shaft and a mold member rotatably mounted on the shaft, the combination, with means for rotating the latter, of a plurality of molds carried by the mold member; a piston reciprocable in each mold; an eccentric mounted coaxially with said mold member and operated by the means for rotating said mold member; a connecting rod for each piston operated by the eccentric; automatic feeding means for material to be injected into said molds; means for automatically opening and closing the molds as the mold member rotates, said means including a form for premolding which is spaced a predetermined distance from the molds of said mold member; a further piston in the form; a hopper disposed in effective position to direct material into the form; an operable plunger in the hopper for packing material into said form; means for operating the further piston; a movable cover for individually covering said molds selectively; an arm mounted on said shaft and pivoted at one end to said plunger and at the other end connected to said cover to control operation thereof; and means for imparting an oscillating movement to the arm upon said shaft and thereby operating said cover.

GEORGES OYER.

REFERENCES CITED

The following references are of record in the file of this patent:

UNITED STATES PATENTS

| Number | Name | Date |
| --- | --- | --- |
| 776,577 | Welling | Dec. 6, 1904 |
| 798,599 | Conrad | Sept. 5, 1905 |
| 816,374 | Pratt | Mar. 27, 1906 |
| 932,035 | Langer | Aug. 24, 1909 |
| 2,052,061 | Toelke | Aug. 25, 1936 |
| 2,287,675 | Fair et al. | June 23, 1942 |